(12) United States Patent
Iwasa et al.

(10) Patent No.: US 8,402,696 B2
(45) Date of Patent: Mar. 26, 2013

(54) WEATHER STRIP

(75) Inventors: Norimasa Iwasa, Aichi-ken (JP);
Masanori Aritake, Aichi-ken (JP);
Satoshi Toki, Aichi-ken (JP)

(73) Assignee: Toyoda Gosei Co., Ltd., Aichi-Ken (JP)

( * ) Notice: Subject to any disclaimer, the term of this patent is extended or adjusted under 35 U.S.C. 154(b) by 0 days.

(21) Appl. No.: 13/200,925

(22) Filed: Oct. 5, 2011

(65) Prior Publication Data

US 2012/0031009 A1 Feb. 9, 2012

Related U.S. Application Data

(62) Division of application No. 12/076,232, filed on Mar. 14, 2008.

(30) Foreign Application Priority Data

Mar. 15, 2007 (JP) ................................ 2007-066297
May 23, 2007 (JP) ................................ 2007-136923

(51) Int. Cl.
*E06B 7/16* (2006.01)

(52) U.S. Cl. ..................... 49/490.1; 49/498.1; 49/475.1; 49/495.1; 296/146.9

(58) Field of Classification Search ................ 49/490.1, 49/498.1, 475.1, 495.1; 428/122; 296/146.9
See application file for complete search history.

(56) References Cited

U.S. PATENT DOCUMENTS

| | | | |
|---|---|---|---|
| 3,952,455 A | 4/1976 | McAlarney | |
| 4,702,039 A | 10/1987 | Bocchinfuso | |
| 4,919,471 A | 4/1990 | Seino et al. | |
| 4,928,431 A | 5/1990 | Kuzuhara et al. | |
| 5,367,830 A | 11/1994 | Omura et al. | |
| 5,383,701 A | 1/1995 | Okada | |
| 5,511,343 A * | 4/1996 | Guillon | 49/479.1 |
| 5,556,672 A | 9/1996 | Akachi et al. | |
| 5,669,657 A | 9/1997 | Miyazawa | |

(Continued)

FOREIGN PATENT DOCUMENTS

| | | |
|---|---|---|
| CN | 1730307 A | 2/2006 |
| EP | 434210 A2 | 6/1991 |

(Continued)

OTHER PUBLICATIONS

Presentation of Publication issued on Oct. 26, 2011 (with an English translation).
Chinese Office Action dated Jun. 26, 2009, with English translation.
Offer of Publications for Japanese Patent Application No. 2007-136923 dated Jul. 7, 2009, with English translation.

(Continued)

*Primary Examiner* — Katherine W Mitchell
*Assistant Examiner* — Marcus Menezes
(74) *Attorney, Agent, or Firm* — McGinn IP Law Group, PLLC

(57) ABSTRACT

A weather strip includes a trim portion that is a substantially U-shaped, that is mounted on a flange portion provided along a door opening circumference portion of a vehicle, and that is equipped with a vehicle outer-sided side wall portion, a vehicle inner-sided side wall portion, and a coupling portion for coupling the side wall portions to each other, and a seal portion including a hollow portion. The seal portion includes a first elongated portion which is elongated to a vehicle outer side from a portion located in a vicinity of a boundary portion between the seal portion and the coupling portion of the vehicle outer-sided side wall portion, a second elongated portion which is elongated to a vehicle outer side from a portion located in a vicinity of a tip portion of the vehicle outer-sided side wall portion, and an expanded portion having substantially an arc shape.

11 Claims, 5 Drawing Sheets

U.S. PATENT DOCUMENTS

| | | | |
|---|---|---|---|
| 5,866,232 A * | 2/1999 | Gatzmanga | 428/122 |
| 6,442,902 B1 | 9/2002 | Van Den Oord | |
| 6,601,346 B2 | 8/2003 | Nozaki | |
| 6,677,020 B2 * | 1/2004 | Dron | 428/36.91 |
| 6,926,944 B2 * | 8/2005 | Watanabe | 428/122 |
| 6,972,140 B2 | 12/2005 | Watanabe | |
| 7,097,180 B2 | 8/2006 | Kuzuya et al. | |
| 7,197,850 B2 | 4/2007 | Mizutani et al. | |
| 2001/0027622 A1 * | 10/2001 | Mine et al. | 49/490.1 |
| 2003/0019160 A1 * | 1/2003 | Oda et al. | 49/498.1 |
| 2003/0150168 A1 * | 8/2003 | Van Den Oord | 49/490.1 |
| 2004/0079032 A1 | 4/2004 | Russell et al. | |
| 2004/0137197 A1 * | 7/2004 | Watanabe | 428/122 |
| 2005/0155292 A1 | 7/2005 | Cittadini et al. | |
| 2006/0162257 A1 * | 7/2006 | Nozaki et al. | 49/490.1 |
| 2007/0180776 A1 | 8/2007 | Oba et al. | |
| 2009/0000206 A1 | 1/2009 | Okajima et al. | |
| 2009/0001754 A1 | 1/2009 | Tamaoki et al. | |
| 2009/0100761 A1 | 4/2009 | Hashimoto et al. | |
| 2010/0263292 A1 | 10/2010 | Harland | |

FOREIGN PATENT DOCUMENTS

| | | | |
|---|---|---|---|
| JP | 01-109145 A | | 4/1989 |
| JP | 01-244920 A | | 9/1989 |
| JP | 02-092722 A | | 4/1990 |
| JP | 7-61291 A | | 3/1995 |
| JP | 11-28936 A | | 2/1999 |
| JP | 2002-293200 A | | 10/2002 |
| JP | 2003-011740 A | | 1/2003 |
| JP | 2003011740 A | * | 1/2003 |
| JP | 2004-175193 A | | 6/2004 |
| JP | 2004175193 A | * | 6/2004 |
| JP | 2004-237900 A | | 8/2004 |
| JP | 3621662 | | 11/2004 |
| JP | 2007-30588 A | | 2/2007 |
| JP | 2007-030646 A | | 2/2007 |

OTHER PUBLICATIONS

Notification of Reasons for Refusal dated May 20, 2011 (with English translation).

* cited by examiner

WEATHER STRIP

The present application is a Divisional Application of U.S. patent application Ser. No. 12/076,232, filed on Mar. 14, 2008, which is based on and claims priority from Japanese patent application No. 2007-066297, filed on Mar. 15, 2007 and Japanese patent application No. 2007-136923, filed on May 23, 2007, the entire contents of which are incorporated herein by reference.

BACKGROUND OF THE INVENTION

1. Field of the Invention

The present invention is related to a weather strip which is mounted on a door opening circumferential portion of a vehicle.

2. Description of the Related Art

Generally speaking, weather strips are provided on door opening circumferential portions of vehicles such as automobiles. As indicated in FIG. 4, a weather strip 70 has been equipped with a trim portion 72 having a substantially U-shaped form of a sectional plane thereof, and a seal portion 73 having a hollow portion 74. The trim portion 72 is mounted on a flange portion 71 provided along a door opening circumferential portion of a vehicle. The seal portion 73 is provided in such a manner that the seal portion 73 is projected from the trim portion 72 to an outer side of the vehicle. Then, when a door 75 of the vehicle is closed, the seal portion 73 is contacted to a circumferential portion of the door 75 under pressure, so that the door 75 is sealed with respect to a vehicle body (refer to, for instant, patent publication 1). It should be understood that as materials for constructing weather strips, the below-mentioned materials are known: ethylene-α-olefin non-cojugated diene copolymer (EPDM), olefin-series thermoplastic elastomer (TPO), and the like are known.

Patent Publication 1: JP-A-2004-237900

As previously described, the seal portion 73 of the weather strip 70 is deformed in such a manner that since the seal portion 73 is contacted to the circumferential portion of the door 5 under pressure, this seal portion 73 is crushed. However, as indicated by a two-dot and dash line of FIG. 4, due to such a cause as right-fitting fluctuations of the door 75, there are some possibilities that under closed condition of the door 5, a portion of the seal portion 73 is bent to the inner side of the hollow portion 74 in such a manner that this portion is separated from the circumferential portion of the door 75, and thereafter, this portion is concaved inside the hollow portion 74, while the portion of the seal portion 73 is contacted to the circumferential portion of the door 75 under pressure. In particular, if such a deformed condition of the seal portion 73 is maintained for a long time, then the following possibilities may occur: That is, the deformed shape of the seal portion 73 cannot be returned to the original shape thereof while the above-described concave is formed. Accordingly, there is such a risk that qualities of outer appearances of the weather strip 70 may be deteriorated due to the above-described reason.

SUMMARY OF THE INVENTION

The present invention has been made to solve the above-described problems, and therefore, has an object to provide a weather strip capable of suppressing a deterioration of outer appearance qualities thereof, which is caused by that a concave is formed in a seal portion.

Next, a description is made of respective means which are suitable for solving and achieving the above-described problems and object under separated items. It should also be understood that operation effects specific to corresponding means are additionally described, if necessary.

Means 1. A weather strip is featured by such a weather strip comprising:

a trim portion having a substantially U-shaped form of a sectional plane thereof, which is mounted on a flange portion provided along a door opening circumference portion of a vehicle, and which is equipped with a vehicle outer-sided side wall portion, a vehicle inner-sided side wall portion, and a coupling portion for coupling both the side wall portions to each other; and a seal portion having a hollow portion; in which the seal portion is contacted to the circumferential portion of the door under pressure when the door is closed; in which:

the seal portion is comprised of: a first elongated portion which is elongated to a vehicle outer side from a portion located in the vicinity of a boundary portion between the seal portion and the coupling portion of the vehicle outer-sided side wall portion; a second elongated portion which is elongated to the vehicle outer side from a portion located in the vicinity of a tip portion of the vehicle outer-sided side wall portion; and an expanded portion having a substantially arc shape of a sectional plane thereof, which constitutes a convex on the vehicle outer side and couples a tip portion of the first elongated portion to a tip portion of the second elongated portion;

both the first and second elongated portions are constructed of a solid material, and the expanded portion is constructed of a sponge material; and in which:

the weather strip is further comprised of:

a bridge for coupling the expanded portion to a portion located in the vicinity of a boundary portion between the bridge and the first extended portion of the vehicle outer-sided side wall portion within the hollow portion, and for dividing the hollow portion into a first hollow portion on the inner circumferential side of the door opening, and a second hollow portion on the outer circumferential side of the door opening.

In accordance with the means 1, since the bridge has been provided inside the hollow portion, restitution (tension) force of the seal portion has been increased. As a result, the portion which has been depressed to the circumferential portion of the door and then has been displaced to the vehicle inner side when the door was closed is brought into such a condition that the portion is more closely fitted to the circumferential portion of the door. As a consequence, the below-mentioned events can be suppressed: That is, the portion which has been contacted to the circumferential portion of the door under pressure is bent to the inner side of the hollow portion in such a manner that this portion is separated from the circumferential portion of the door, and then, is concaved to the inner side of the hollow portion. Moreover, although the door has already been separated from the seal portion, the seal portion was crushed to be deformed, so that the deformed seal portion 6 cannot be returned to the original shape thereof. As a result, it is possible to avoid such an event that since the concaved seal portion can be visually recognized, lowering of the outer appearance quality may be conducted.

Also, in accordance with the means 1, a position of a communicated contact portion (will be referred to as "base-sided communicated contact portion" hereinafter) of the bridge with respect to the vehicle outer-sided side wall portion has been set to a position in the vicinity of a boundary portion of the vehicle outer-sided side wall portion with respect to the first elongated portion. As a consequence, it is possible to suppress such a risk that the bridge props when the door is closed, and relatively large force is required when the door is completely closed. Moreover, such an operation effect can be firmly achieved by that it is possible to suppress such a deformation that the seal portion is concaved by the bridge.

If the base-sided communicated contact portion is excessively approached to the second elongated portion, then there is a risk that the bridge is contacted to the second elongated portion (seal portion) (namely, hollow portion is not formed between bridge and second elongated portion). On the other hand, if the base-sided communicated contact portion of the bridge is excessively separated from the second elongated portion (for instance, base-sided communicated contact portion is positioned to first elongated portion), then there is such a risk that the below-mentioned operation effect cannot be sufficiently achieved. That is, such a deformation is suppressed that the seal portion is contacted to the circumferential portion of the door under pressure so as to be concaved.

Means 2. A weather strip is featured by such a weather strip comprising:

a trim portion having a substantially U-shaped form of a sectional plane thereof, which is mounted on a flange portion provided along a door opening circumference portion of a vehicle, and which is equipped with a vehicle outer-sided side wall portion, a vehicle inner-sided side wall portion, and a coupling portion for coupling both the side wall portions to each other; and a seal portion having a hollow portion; in which the seal portion is contacted to the circumferential portion of the door under pressure when the door is closed; in which:

the seal portion is comprised of: a thicker-thickness portion at a predetermined portion thereof which abuts against the circumferential portion of the door when the door is closed, in which each of portions of the seal portion on the inner circumferential side of the door opening and on the outer circumferential side of the door opening, which are located adjacent to the thicker-thickness portion, is constructed as a thinner-thickness portion which is thinner than the thicker-thickness portion; and in which:

the weather strip is further comprised of:

a bridge for coupling the portion of the seal portion on the outer circumferential side of the door opening to the vehicle outer-sided side wall portion rather than the thinner-thickness portion of the outer circumferential side of the door opening within the hollow portion.

Basically, in accordance with the means 2, a similar operation effect to that of the above-described means 1 can be achieved. Also, in accordance with this means 2, the thicker-thickness portion has been provided in the seal portion at such a portion (will be referred to as "abutting portion" hereinafter) which abuts against the circumferential portion of the door when the door is closed, so that a rigidness of the abutting portion is increased. As a consequence, it is possible to more firmly suppress such an event that the abutting portion contacted to the door circumferential portion under pressure is bent to the inner side of the hollow portion in such a manner that this abutting portion is separated from the door circumferential portion, and then, is deformed in such a manner that the abutting portion is concaved to the inner side of the hollow portion. As a result, it is possible to avoid such an event that since the seal portion is concaved, lowering of the outer appearance quality may be conducted.

More specifically, the portions located adjacent to the thicker-thickness portion become thinner-thickness portions. In other words, since the portions adjacent to the thicker-thickness portion are actively deformed when the door is closed, as previously explained, even in such a case that the bridge and the thicker-thickness portion are provided so as to increase the rigidness of the seal portion, it is possible to suppress such a risk that the bridge props when the door is closed, and relatively large force is required when the door is completely closed. As a result, while such an operation effect can be achieved by that lowering of the outer appearance quality as to the seal portion is suppressed, the door can be relatively smoothly closed.

Means 3. A weather strip is featured by such a weather strip comprising:

a trim portion having a substantially U-shaped form of a sectional plane thereof, which is mounted on a flange portion provided along a door opening circumference portion of a vehicle, and which is equipped with a vehicle outer-sided side wall portion, a vehicle inner-sided side wall portion, and a coupling portion for coupling both the side wall portions to each other; and a seal portion having a hollow portion; in which the seal portion is contacted to the circumferential portion of the door under pressure when the door is closed; in which:

the seal portion is comprised of: a first elongated portion which is elongated to a vehicle outer side from a portion located in the vicinity of a boundary portion between the seal portion and the coupling portion of the vehicle outer-sided side wall portion; a second elongated portion which is elongated to the vehicle outer side from a portion located in the vicinity of a tip portion of the vehicle outer-sided side wall portion; and an expanded portion having a substantially arc shape of a sectional plane thereof, which constitutes a convex on the vehicle outer side and couples a tip portion of the first elongated portion to a tip portion of the second elongated portion;

both the first and second elongated portions are constructed of a solid material, and the expanded portion is constructed of a sponge material; and in which:

the expanded portion is comprised of: a thicker-thickness portion at a predetermined portion thereof which abuts against the circumferential portion of the door when the door is closed, in which each of portions of the expanded portion on the inner circumferential side of the door opening and on the outer circumferential side of the door opening, which are located adjacent to the thicker-thickness portion, is constructed as a thinner-thickness portion which is thinner than the thicker-thickness portion; and the weather strip is further comprised of:

a bridge for coupling a portion of the expanded portion, which is located on the side of the second elongated portion rather than the thinner-thickness portion on the outer circumferential side of the door opening to another portion thereof located in the vicinity of a boundary portion between the expanded portion and the first elongated portion of the vehicle outer-sided side wall portion within the hollow portion.

In accordance with the means 3, similar operation effects to those of the above-described means 1 and means 2 can be basically achieved.

Means 4. A weather strip is featured by such a weather strip comprising:

a trim portion having a substantially U-shaped form of a sectional plane thereof, which is mounted on a flange portion provided along a door opening circumference portion of a vehicle, and which is equipped with a vehicle outer-sided side wall portion, a vehicle inner-sided side wall portion, and a coupling portion for coupling both the side wall portions to each other; and a seal portion having a hollow portion; in which the seal portion is contacted to the circumferential portion of the door under pressure when the door is closed; in which:

the seal portion is comprised of: a first elongated portion which is elongated to a vehicle outer side from a portion located in the vicinity of a boundary portion between the seal portion and the coupling portion of the vehicle outer-sided side wall portion; a second elongated portion which is elongated to the vehicle outer side from a portion located in the vicinity of a tip portion of the vehicle outer-sided side wall portion; and an expanded portion having a substantially arc shape of a sectional plane thereof, which constitutes a convex on the vehicle outer side and couples a tip portion of the first elongated portion to a tip portion of the second elongated portion;

both the first and second elongated portions are constructed of a solid material, and the expanded portion is constructed of a sponge material; and in which:

the weather strip is further comprised of:

a bridge for coupling the expanded portion to a portion located in the vicinity of a boundary portion between the bridge and the first extended portion of the vehicle outer-sided side wall portion within the hollow portion, and for dividing the hollow portion into a first hollow portion on the inner circumferential side of the door opening, and a second hollow portion on the outer circumferential side of the door opening;

a portion within the expanded portion, which forms the first hollow portion, abuts against the circumferential portion of the door and then is depressed to the vehicle inner side when the door is closed; and the expanded portion is comprised of: a thicker-thickness portion at a predetermined portion of the expanded portion containing a portion which firstly abuts against the circumferential portion of the door when the door is closed; and a thinner-thickness portion thinner than the thicker-thickness portion at each of portions between the thicker-thickness portion and a communicated contact portion with respect to the bridge, and between the thicker-thickness portion and a tip portion of the first elongated portion.

In accordance with the means 4, similar operation effects to those of the above-described means 2 and means 3 can be basically achieved. Also, in this means 4, the circumferential portion of the door is contacted with respect to the portion of the expanded portion under pressure, which is located on the door opening inner circumferential side, rather than the communicated contact portion with respect to the bridge. Accordingly, the bridge does not directly support the portion (abutting portion) which has been depressed against the circumferential portion of the door so as to be displaced to the vehicle inner side, but supports the abutting portion on the side portion of the abutting portion with props. As a consequent, the abutting portion can be more firmly contacted to the circumferential portion of the door under pressure over a wider range.

Means 5. A weather strip, recited in any one of the means 1, 3, and 4, is featured by that a position of the communicated contact portion of the bridge with respect to the expanded portion is set within such a range that a value is larger than, or equal to 0.20, and also, is smaller than, or equal to 0.35, and the value is calculated by dividing a circumferential length of the expanded portion from a tip portion of the second elongated portion up to the communicated contact portion by another circumferential length of the expanded portion from a tip portion of the second elongated portion up to a tip portion of the first elongated portion.

As previously described in the means 5, since the position of the communicated contact portion (will be referred to as "tip-sided communicated contact portion" hereinafter) of the bridge with respect to the expanded portion has been set, such an operation effect that the seal portion is contacted to the circumferential portion of the door under pressure can be firmly achieved. Moreover, it is possible to suppress such an event that when the door is closed, the bridge props, so that the door can be hardly closed.

It should be understood that it is preferable to set such a value (L1/L2) is larger than, or equal to "0.22", and also, is smaller than, or equal to "0.30", and the value is calculated by dividing a circumferential length (L1) of the expanded portion from the tip portion of the second elongated portion up to the communicated contact portion by another circumferential length (L2) of the expanded portion from the tip portion of the second elongated portion up to the tip portion of the first elongated portion. More preferably, the value (L1/L2) is larger than, or equal to "0.23", and further, smaller than, or equal to "0.27." When the value "L1/L2" is smaller than "0.20", namely, in such a case that the tip-sided communicated contact portion of the bridge is approached to the tip portion of the second elongated portion, there is such a risk that an effect that the seal portion is contacted to the circumferential portion of the door under pressure cannot be sufficiently achieved. On the other hand, when the value "L1/L2" is larger than "0.35", namely, in such a case that the tip-sided communicated contact portion of the bridge is approximated to the tip portion of the first elongated portion, there is another risk that when the door is closed, the bridge props, and then, when the door is completely closed, relatively large force is required.

Means 6. A weather strip, recited in any one of the means 2 to 4, is featured by that the thickness of the thicker-thickness portion is 1.1 times larger than, or equal to, and 1.4 times smaller than, or equal to the thickness of the thinner-thickness portion.

In accordance with the means 6, the thickness of the thicker-thickness portion has been made thicker than that of the thinner-thickness portion by approximately 10 percent to 40 percent. Since the thickness balance is set in the above-described manner, the deformation of the thicker-thickness portion can be suppressed, and the thinner-thickness portion can be actively deformed. It should also be noted that it is more desirable to set that the thickness of the thicker-thickness portion is 1.2 times larger than, or equal to, and 1.3 times smaller than, or equal to the thickness of the thinner-thickness portion.

Means 7. A weather strip, recited in either the means 3 or the means 4, is featured by that a position of the communicated contact portion of the bridge with respect to the expanded portion is set within such a range that a value is larger than, or equal to 0.20, and also, is smaller than, or equal to 0.35, and the value is calculated by dividing a circumferential length of the expanded portion from a tip portion of the second elongated portion up to the communicated contact portion by another circumferential length of the expanded portion from the tip portion of the second elongated portion up to a tip portion of the first elongated portion; and in which:

the thickness of the thicker-thickness portion is 1.1 times larger than, or equal to, and 1.4 times smaller than, or equal to the thickness of the thinner-thickness portion.

In accordance with the means 7, a similar operation effect to those of the above-described means 5 and 6 can be achieved.

Means 8. A weather strip, recited in any one of the means 1 to the means 7, is featured by that the bridge is constructed of a sponge material.

In accordance with the means 8, since the bridge is constructed of the sponge material, it is possible to furthermore suppress such an event that the bridge props when the door is closed, and also, such an operation effect that the seal portion is contacted to the door circumferential portion under pressure can be more firmly achieved.

Means 9. A weather bridge, recited in any one of the means 1 to the means 8, is featured by that a large curvature portion is provided within the expanded portion, the curvature of which becomes a maximum curvature value at an outer circumferential-sided forming portion which corresponds to a portion on the outer circumferential-side of the door opening rather than the communicated contact portion with respect to the bridge; and the outer circumferential-sided forming portion is expanded to the outer circumferential side of the hollow portion.

In the case that a weather strip (extrusion-molded member) which is formed in a substantially linear shape by operating a predetermined extrusion molding machine is bent so as to be mounted with respect to a bent portion such as a corner portion of the door opening, there is such a risk that a seal portion having a hollow portion may be crushed to be deformed in such a manner that this seal portion is concaved to the inner side of the hollow portion at this bent portion.

Also, since the bridge is provided as explained in the above-described means 1 to means 4, it is possible to suppress that the seal portion is crushed to be deformed due to such a fact that the weather strip is bent. However, with respect to such a portion (outer circumferential-sided forming portion) within the expanded portion, which is located on the outer circumferential side of the door opening rather than the communicated contact portion thereof with respect to the bridge, there is such a risk that this portion of the expanded portion may be still crushed to be deformed in such a manner that this portion may be concaved to the inner side of the hollow portion.

In contrast to the above-described weather strip, in accordance with the means 9, while the large curvature portion has been provided with respect to the outer circumferential-sided forming portion, this outer circumferential-sided forming portion has been expanded on the outer circumferential side of the hollow portion. There is such a risk that the above-described outer circumferential-sided forming portion is crushed to be then deformed when the weather strip is bent. As a result, when the outer circumferential-sided forming portion receives the stress which is directed toward the inner circumferential side of the door opening, it is possible to suppress such an event that the outer circumferential-sided forming portion is crushed to be then deformed in such a manner that this outer circumferential-sided forming portion is concaved inside the hollow portion. As a consequence, it is also possible to suppress such a risk that a large difference is produced in these shapes (expanding degrees) between the outer circumferential-sided forming portion which corresponds to the bent portion of the door opening, and the outer circumferential-sided forming portion which corresponds to the linear portion of the door opening. Accordingly, it is possible to suppress that the quality of the outer appearance as to the weather strip is deteriorated. Also, the workability can be improved and the cost can be suppressed, as compared with such a case that the pad, or the like is inserted in the hollow portion in order to avoid that the hollow portion is crushed to be deformed.

Means 10. A weather strip, recited in the means 9, is featured by that the seal portion is comprised of: a first elongated portion which is elongated to a vehicle outer side from a portion located in the vicinity of a boundary portion between the seal portion and the coupling portion of the vehicle outer-sided side wall portion; a second elongated portion which is elongated to the vehicle outer side from a portion located in the vicinity of a tip portion of the vehicle outer-sided side wall portion; and an expanded portion having a substantially arc shape of a sectional plane thereof, which constitutes a convex on the vehicle outer side and couples a tip portion of the first elongated portion to a tip portion of the second elongated portion; and in which:

a position of the large curvature portion is set within such a range that a value is larger than, or equal to 0.60, and also, is smaller than, or equal to 0.85, and the value is calculated by dividing a circumferential length of the expanded portion from the tip portion of the second elongated portion up to the large curvature portion by another circumferential length of the expanded portion from the tip portion of the second elongated portion up to the communicated contact portion with respect to the bridge.

As previously described in the means 10, the large curvature portion is formed on the outer circumferential-sided forming portion near the communicated contact portion with respect to the bridge, so that an elongated angle of the outer circumferential-sided forming portion which is elongated from the communicated contact portion with respect to the bridge toward the outer circumferential side of the door opening can be approximated to the outer circumferential direction of the door opening as being permitted as possible, which also corresponds such a direction along which the weather strip is bent to be deformed. As a consequence, when the outer circumferential-sided forming portion receives the stress directed to the inner circumferential side of the door opening, this outer circumferential-sided forming portion (more specifically, portion on the side of communicated contact portion with respect to bridge) can be more firmly propped, so that it is possible to more firmly suppress such an event that the outer circumferential-sided forming portion is crushed to be deformed.

Means 11. A weather strip, recited in either the means 9 or the means 10, is featured by that the seal portion is comprised of: a first elongated portion which is elongated to a vehicle outer side from a portion located in the vicinity of a boundary portion between the seal portion and the coupling portion of the vehicle outer-sided side wall portion; a second elongated portion which is elongated to the vehicle outer side from a portion located in the vicinity of a tip portion of the vehicle outer-sided side wall portion; and an expanded portion having a substantially arc shape of a sectional plane thereof, which constitutes a convex on the vehicle outer side and couples a tip portion of the first elongated portion to a tip portion of the second elongated portion; and in which:

a portion of an inner side plane of the outer circumferential-sided forming portion is located on an outer circumferential side of the hollow portion rather than a line segment; and the line segment connects a center position along a thickness direction within the outer circumferential-sided forming portion at the communicated contact portion with respect to the bridge to another center position along the thickness direction in a boundary portion between the tip portion of the second elongated portion and the outer circumferential-sided forming portion.

Since the structure of the means 11 is employed, the outer circumferential-sided forming portion is more firmly expanded to the outer circumferential side of the hollow portion, so that the operation effects of the above-described means 9 and 10 can be more firmly achieved. Also, since the outer circumferential-sided forming portion is expanded without making the thickness of the outer circumferential-sided forming portion thicker, it is possible to avoid such a risk that since the thickness of the outer circumferential-sided forming portion becomes excessively thick, the function as to the weather strip is lowered. This function of the weather strip is capable of sealing the space between the door and the automobile body.

Means 12. A weather strip, recited in any one of the means 9 to the means 11, is featured by that the large curvature portion is located on the inner circumferential side of the door opening rather than an edge portion within the expanded portion, which is located on the outermost circumferential side of the door opening, and also is located on the vehicle inner side rather than an edge portion of the expanded portion, which is located on the outermost side of the vehicle.

In accordance with the means 12, it is possible to avoid the below-mentioned risk, namely, the function as the weather strip is deteriorated, due to such a fact that the outer circumferential-sided forming portion is excessively expanded. As the function of the weather strip, this weather strip may seal the space between the door and the body of the automobile.

Means 13. A weather strip, recited in any one of the means 1 to the means 12, is featured by that in the bridge, the communicated contact portion thereof with respect to the expanded portion is located on the outer circumferential side of the door opening rather than the communicated contact portion thereof with respect to the vehicle outer-sided side wall portion.

In accordance with the means 13, it is possible to more firmly suppress such a risk that when the door is closed, the bridge props, and when the door is completely closed, relatively large force is required. Also, the bridge can prop when the seal portion (outer circumferential-sided forming portion) receives such a stress directed toward the inner circumferential side of the door opening. For instance, it is possible to suppress such an event that the seal portion is crushed to be deformed on the inner circumferential side of the door opening as a whole, as compared with such a case that the bridge is elongated parallel to a width direction of a vehicle.

DESCRIPTION OF THE PREFERRED EMBODIMENTS

Figure 1:
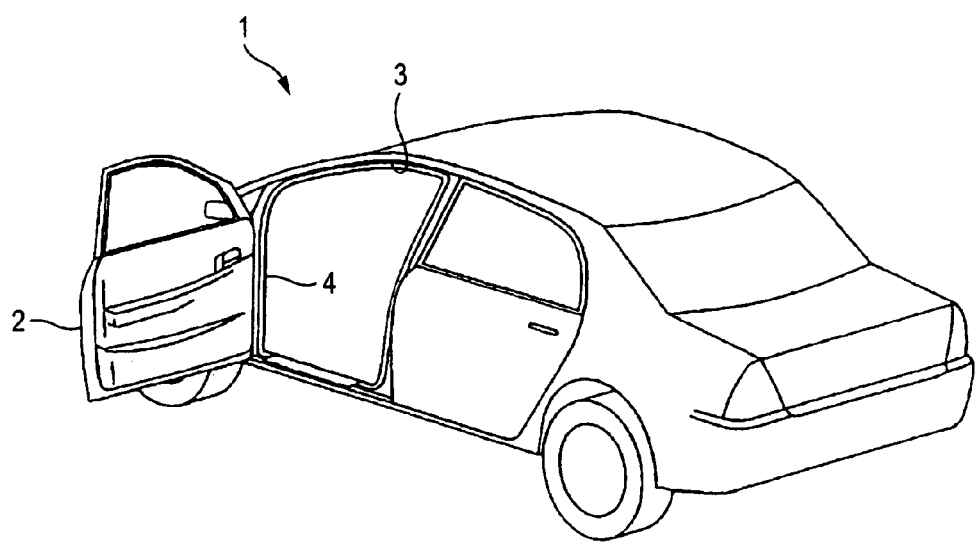
FIG. 1 is a perspective view for showing an automobile when a front door is under open condition.

Referring now to drawings, a description is made of one embodiment mode of the present invention. As indicated in FIG. 1, a door (front door shown in this drawing: will be simply referred to as "door 2" hereinafter) of an automobile 1 has been mounted on the automobile 1 corresponding to a vehicle in such a manner that the door 2 can be freely opened and closed, while a weather strip 4 has been mounted on a circumferential portion of a door opening 3 of an automobile body (main body of vehicle) and the circumferential portion corresponds to the door 2. The weather strip 4 of the present embodiment mode is manufactured by an extrusion molding method, and has a substantially ring shape as an entire shape.

Figure 2:
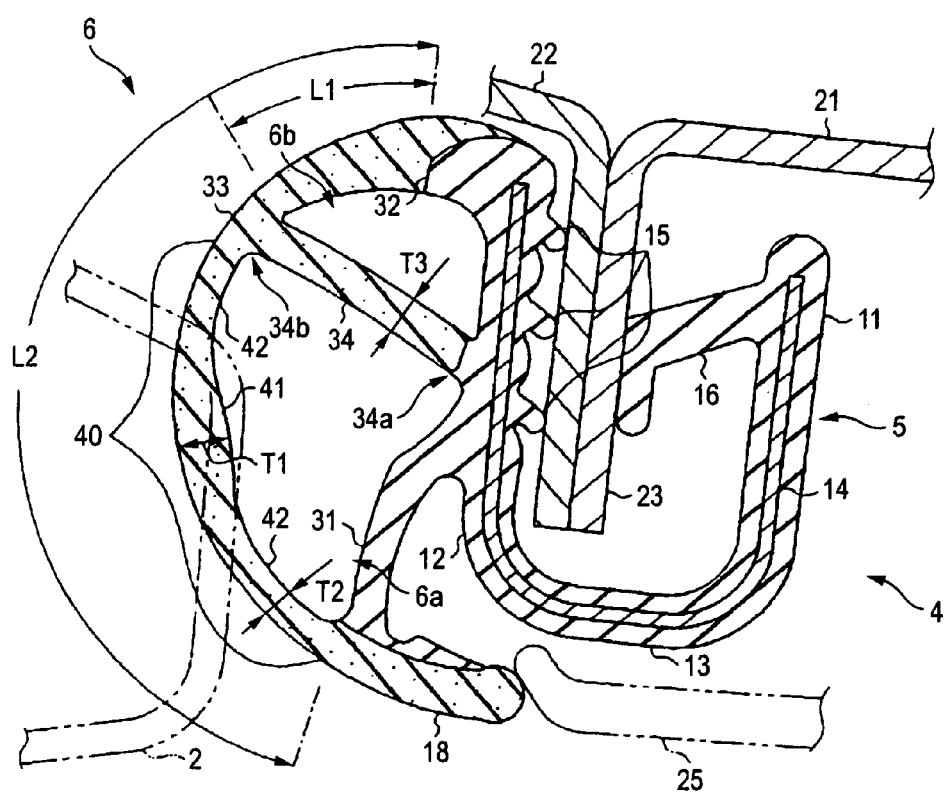
FIG. 2 is a sectional view for indicating a weather strip according to an embodiment mode of the present invention.

As indicated in FIG. 2, the weather strip 4 has been provided with a trim portion 5 and a seal portion 6. The trim portion 5 has been equipped with a vehicle inner-sided side wall portion 11, a vehicle outer-sided side wall portion 12, and a coupling portion 13 which couples both side wall portions 11 and 12 to each other, an entire shape of this trip portion 5 has a substantially U-shape, as viewed on a sectional plane thereof. The trim portion 5 has been manufactured by such a material of solid EPDM (ethylene-propylene-diene copolymer rubber). Also, a so-called "insert" 14 made of a metal has been embedded inside the trim portion 5.

A plurality of holding lip portions 15 which are elongated to the inside (inner side of vehicle) of the trim portion 5 have been formed in an integral body on an inner plane of the vehicle outer-sided side wall portion 12, whereas a holding lip portion 16 which is elongated to the inside (inner side of vehicle) of the trim portion 5 have been formed in an integral body on an inner plane of the vehicle inner-sided side wall portion 11.

Further, a flange portion 23 has been formed at the circumferential portion of the door opening 3 by joining an inner panel 21 of the automobile body to an outer panel 22 thereof. Then, the weather strip 4 has been mounted on the circumferential portion of the door opening 3 in such a manner that the flange portion 23 is fitted into the inside portion of the trim portion 5. It should also be noted that the mounting condition of the weather trip 4 may be basically maintained based upon elastic force exerted by the holding lip portions 15 and 16 and the like.

The seal portion 6 is made of a hollow shape, and has been provided in such a manner that this seal portion 6 is projected from the vehicle outer-sided side wall portion 12. Then, when the door 2 is closed, since the seal portion 6 is contacted to the circumferential portion of the door 2 under pressure, this seal portion 6 is crushed to be then deformed. As a result, the door 2 is sealed with the automobile body.

Now, a detailed description is made of a structure of the seal portion 6. The seal portion 6 has been provided with a first elongated portion 31, a second elongated portion 32, and also, an expanded portion 33. The first elongated portion 31 is elongated to the vehicle outer side (namely, left side in FIG. 2), while this first elongated portion 31 is inclined from a portion near a boundary portion between the coupling portion 13 of the vehicle outer-sided side wall portion 12 and the seal portion 6 to an inner circumferential side (namely, lower side in FIG. 2) of the door opening 3. The second elongated portion 32 is elongated from a tip portion of the vehicle outer-sided side wall portion 12 to the vehicle outer side along a direction substantially perpendicular to the vehicle outer-sided side wall portion 12. The expanded portion 33 couples a tip portion of the first elongated portion 31 to a tip portion of the second elongated portion 32. The expanded portion 33 has been curved in such a manner the curved portion becomes a convex with respect to the vehicle outer side. The entire portion of the seal portion 6 has been formed in a substantially D-shaped shape, as viewed on the sectional plane thereof. Also, both the first elongated portion 31 and the second elongated portion 32 have been constructed by employing a material of solid EPDM, and the expanded portion 33 has been made of a material of sponge EPDM.

It should also be noted that a lip portion 18 has been provided on the seal portion 6, and thus, an edge portion of an interior goods 25 such as a garnish is covered by this lip portion 18. The lip portion 18 has been formed in such a manner that the expanded portion 33 is extended to an inner circumferential side (vehicle inner side) of the door opening 3. Also, a sponge layer elongated from the expanded portion 33 has been formed on the side of an outer surface of the second elongated portion 32. As a result, a boundary portion between the second elongated portion 32 and the expanded portion 33 does not appear to an outer appearance. Furthermore, the lip portion 18 has been continuously elongated and formed from the expanded portion 33, and has been constructed by employing the same sponge EPDM as that of the expanded portion 33. As a result, a boundary portion between the first elongated portion 31 and the expanded portion 33 does not appear to the outer appearance. Since these structures are formed, it is possible to avoid such a problem that a deterioration of qualities of the outer appearance is conducted by such a cause that the boundary portions between the expanded portion 33 and the first elongated portion 31, and also the second elongated portion 32 may appear to the outer appearance.

Next, a bridge portion 34 which is bridged from the vehicle outer-sided side wall 12 to the expanded portion 33 has been provided on the inner side of the seal portion 6. Thus, a hollow portion formed inside the seal portion 6 has been subdivided into a first hollow portion 6a located at an inner circumferential side of the door opening 3, and a second hollow portion 6b located at an outer circumferential side thereof. The bridge portion 34 is made of the material of sponge EPDM, and is formed at the same time with the trim portion 5 and the seal portion 6 when an extrusion molding method is performed thereto.

Also, the bridge 34 has been elongated in a substantially linear form along a direction which is obliquely intersected with respect to opening/closing direction (namely, right/left direction as viewed in FIG. 2) of the door 2. More precisely speaking, a position of a communicated contact portion (base-sided communicated contact portion 34a) of the bridge 34 with respect to the vehicle outer-sided side wall portion 12 has been set in the vicinity of the boundary portion between the bridge 34 and the first elongated portion 31 of the vehicle outer-sided side wall portion 12. On the other hand, a position of a communicated contact portion (tip-sided communicated contact portion 34b) of the bridge 34 with respect to the expanded portion 33 has been set within such a range that the below-mentioned value of "L1/L2" becomes larger than, or equal to 0.20, and furthermore, becomes smaller than, or equal to 0.35. The above-described value of "L1/L2" is calculated by dividing a circumferential length "L1" of the expanded portion 33 by another circumferential length "L2" thereof. The first-mentioned circumferential length "L1" is defined from the tip portion of the second elongated portion 32 up to the tip-sided communicated contact portion 34b. The last-mentioned circumferential length "L2" is defined from the tip portion of the second elongated portion 32 up to the tip portion of the first elongated portion 31. Also, in the present embodiment mode, an angle defined between the vehicle outer-sided side wall portion 12 and the bridge 34 is larger than, or equal to 50 degrees, and furthermore, is smaller than, or equal to 70 degrees.

In the present embodiment mode, when the door 2 is closed, the below-mentioned structure has been made: That is, such a portion within the expanded portion 33, which constitutes the first hollow portion 6a, abuts against the circumferential portion of the door 2 and then is depressed against the vehicle inner side, while this portion of the expanded portion 33 will be referred to as an "abutting portion 40" hereinafter. Another portion within the expanded portion 33, which constitutes the second hollow portion 6b, basically does not about against the door 2 (namely, this portion is not directly depressed against door 2 to be deformed, but is deformed in such a manner that this portion is pulled by abutting portion 40 which is displaced to vehicle inner side).

Also, as to the expanded portion 33, such a portion within the abutting portion 40, which is located at the outermost vehicle outer position, constitutes a thicker-thickness portion 41. In other words, a portion of the abutting portion 40 becomes the thicker-thickness portion 41, and contains a portion which firstly abuts against the circumferential portion of the door 2 when the door 2 is closed. Moreover, both a portion defined from the thicker-thickness portion 41 up to the tip portion (tip-sided communicated contact portion 31b) of the bridge 34, and another portion defined from the thicker-thickness portion 41 up to the first elongated portion 31 have been made as thinner-thickness portions 42 having thicknesses thinner than the thickness of the thicker-thickness portion 41. In other words, an intermediate portion of the abutting portion 40 which is mainly contacted to the circumferential portion of the door 2 under pressure so as to be displaced to the vehicle inner side is made as the thicker-thickness portion 41, so that this intermediate portion can be hardly deformed, whereas both adjoining portions of the thicker-thickness portion 41 along the circumferential direction of the seal portion 6 are made as the thinner-thickness portions 42, so that these adjoining portions of the thicker-thickness portion 41 can be readily deformed.

In addition, a thickness "T1" of the thicker-thickness portion 41 has been set in such a manner that this thickness T1 becomes "1.1" time larger than, or equal to a thickness T2 of the thinner-thickness portion 42, and also becomes "1.4" times smaller than, or equal to the thickness T2. Also, a thickness T3 of the bridge 34 has been set in such a manner that this thickness T3 becomes "0.9" times larger than, or equal to the thickness T2 of the thinner-thickness portion 42, and also becomes "1.3" times smaller than, or equal to the thickness T2. In the present embodiment mode, it should be noted that the thickness T1 of the thicker-thickness portion 41 has been set to approximately 1.8 mm; the thickness T2 of the thinner-thickness portion 42 has been set to approximately 1.4 mm; and the thickness T3 of the bridge 34 has been set to approximately 1.6 mm. In addition, the thickness of the portion within the expanded portion 33, which constitutes the second hollow portion 6b, has been made thicker than the thickness of the thinner-thickness portion 42.

Next, a description is made of deforming operations of the seal portion 6 when the door 2 is closed, and of operation effects caused by the deforming operations.

Figure 3:
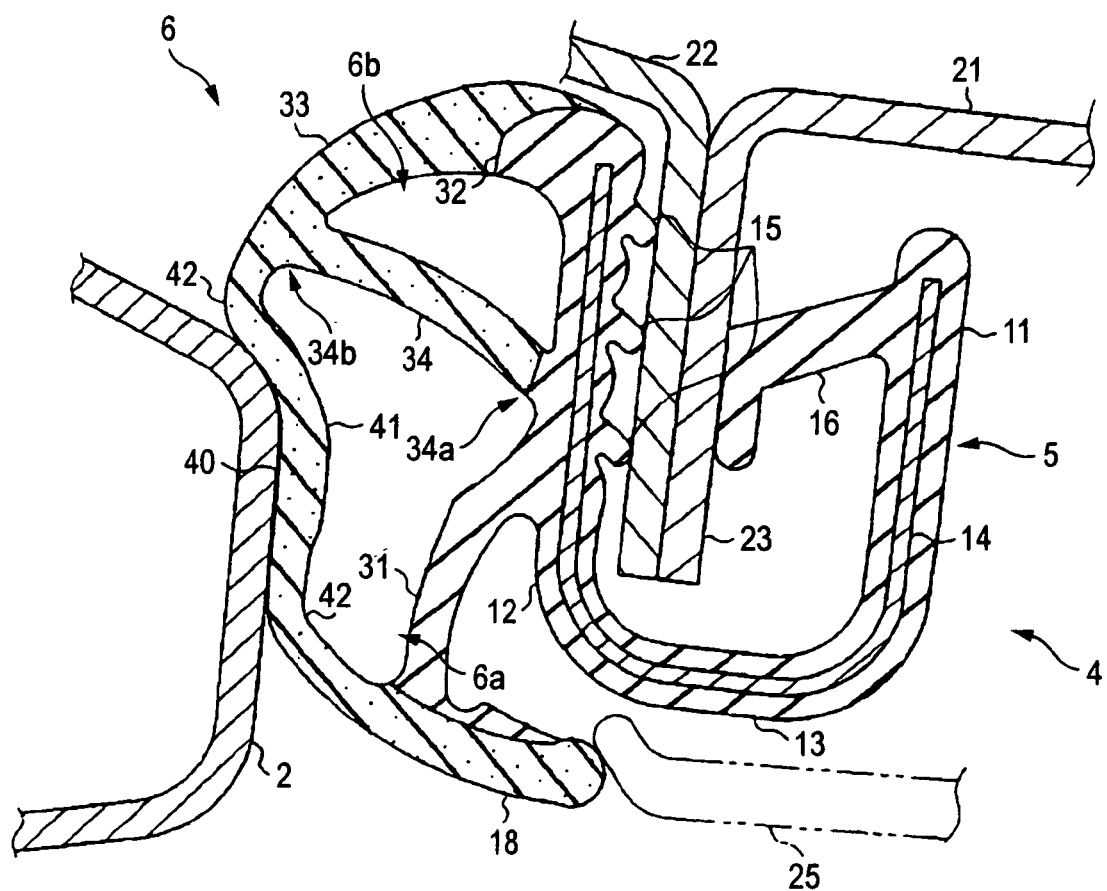
FIG. 3 is a sectional view for showing the weather strip when the door is closed.
Figure 4:
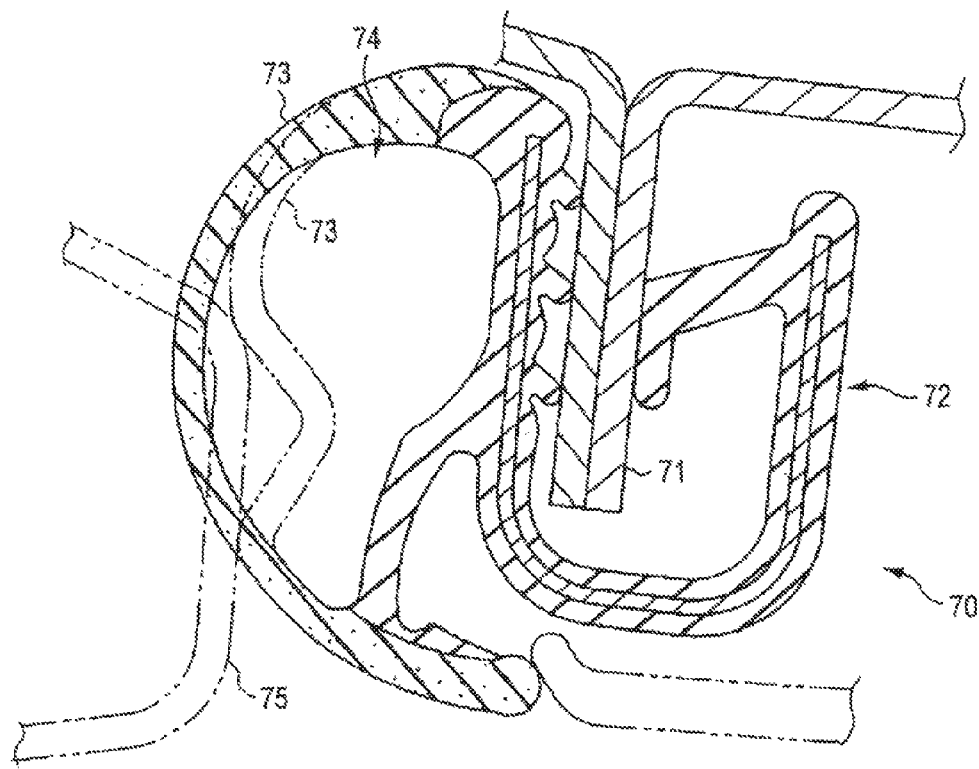
FIG. 4 is a sectional view for representing the conventional weather strip.

When the door 2 is being closed, such a portion within the abutting portion 40, which is located at the outermost vehicle side, namely, the thicker-thickness portion 41 first of all abuts against the circumferential portion of the door 2. Then, when the door 2 is completely closed, as indicated in FIG. 3, the abutting portion 40 is depressed against the circumferential portion of the door 2, and thus is moved to the vehicle inner side. At this time, with respect to the abutting portion 40 which abuts and is depressed against the circumferential portion of the door 2, such a force is exerted in such a manner that the abutting portion 40 is forced to be separated from the door 2, namely, is concaved to the inner side of the hollow portion 6a.

To the contrary, in the present embodiment mode, in the seal portion 6, the thicker-thickness portion 41 has been provided in the abutting portion 40, so that the rigidness of the abutting portion 40 has been increased. Furthermore, since the bridge 34 has been provided inside the seal portion 6, restitution (tension) force of the seal portion 6 has been increased. As a result, the abutting portion 40 which has been depressed to the circumferential portion of the door 2 and then has been displaced to the vehicle inner side when the door 2 was closed is brought into such a condition that the abutting portion 40 is more closely fitted to the circumferential portion of the door 2 (namely, under such a condition that plane of thicker-thickness portion 41 abuts against circumferential portion of door 2). As a consequence, the below-mentioned events can be suppressed: That is, the abutting portion 40 which has been contacted to the circumferential portion of the door 2 under pressure is bent to the inner side of the first hollow portion 6a in such a manner that this abutting portion 40 is separated from the circumferential portion of the door 2, and then, is concaved to the inner side of the first hollow portion 6a. Moreover, although the door 2 has already been separated from the seal portion 6, the seal portion 6 was crushed to be deformed, so that the deformed seal portion 6 cannot be returned to the original shape thereof. As a result, in accordance with the present embodiment mode, it is possible to avoid such an event that since the concaved seal portion 6 can be visually recognized, lowering of the outer appearance quality may be conducted.

More specifically, in the present embodiment mode, the tip-sided communicated contact portion 34b has been located at a place which is deviated from the portion which is directly depressed to the circumferential portion of the door 2 so as to be displaced to the vehicle inner side (namely, abutting portion 40 has been set to inner circumferential side of door opening 2 rather than tip-sided communicated contact portion 34b). Accordingly, the bridge 34 does not directly support the abutting portion 40 which has been depressed against the circumferential portion of the door 2 so as to be displaced to the vehicle inner side from the inner side of the hollow portions 6a and 6b, but supports the abutting portion 40 on the side portion of the abutting portion 40 with props. As a consequence, the abutting portion 40 can be more firmly contacted to the circumferential portion of the door 2 under pressure over a wider range.

Further, both the adjoining portions of the thicker-thickness portion 41 become the thinner-thickness portion 42 along the circumferential direction of the seal portion 6. In other words, the circumferential portion of the thicker-thickness portion 41 may be actively deformed when the door 2 is closed. As a consequence, as previously described, even in such a case that the bridge 34 and the thicker-thickness portion 41 are provided so as to increase the rigidity of the seal portion 6, it is possible to suppress such a risk that when the door 2 is being closed, the seal portion 6 props and then when the door 2 is completely closed, relatively large force is required. As a result, while it is possible to achieve the above-described operation effect which may suppress degrading of the outer appearance quality as to the seal portion 6, the door 2 can be relatively smoothly closed.

In addition, in accordance with the present embodiment mode, the manufacturing cost can be improved and also the manufacturing workability can be improved, as compared with such a case that a pad, or the like is inserted into the inner side (hollow portion) of the seal portion in order to suppress the concave of the seal portion.

Also, the position of the base-sided communicated contact portion of the bridge 34 has been set to such a position in the vicinity of the boundary portion between the first elongated portion 31 of the vehicle outer-sided side wall portion 12 and the own base-sided communicated contact portion 34a, and furthermore, the position of the tip-sided communicated contact portion 34b has been set in such a manner that the value of "L1/L2" becomes approximately "0.25." As a consequence, the below-mentioned operation effects can be more firmly achieved: That is, it is possible to suppress such a risk that when the door 2 is being closed, the seal portion 6 props and the when the door 2 is completely closed, relatively large force is required. In addition, it is possible to suppress such a deformation that the seal portion 6 is contacted to the circumferential portion of the door 2 under pressure, so that the seal portion 6 is concaved.

Moreover, the thickness of the thicker-thickness portion 41 has been made thicker than that of the thinner-thickness portion 42 by approximately 10 percent to 40 percent. Since the thickness balance is set in the above-described manner, the deformation of the thicker-thickness portion 41 can be suppressed, and the thinner-thickness portion 42 can be actively deformed. In addition, since the bridge 34 is constructed of the sponge material, it is possible to more firmly achieve such operation effects: That is, it is possible to suppress such an event that the bridge 34 props when the door 2 is closed. Also, the seal portion 6 can be contacted to the circumferential portion of the door 2 under pressure.

It should also be understood that the present invention is not limited only to the contents described in the above-explained embodiment mode, but may be alternatively embodied in accordance with the below-mentioned manners. As apparent from the foregoing descriptions, other application examples and modified examples (which are not shown) may be apparently exemplified.

(a) In the above-described embodiment mode, the weather strip 4 has been embodied which is provided on the circumferential portion of the door opening 3 on the automobile body side; corresponding to the door 2, on the front side. Alternatively, the present invention may be applied to such weather strips which are provided on circumferential portions of door openings which correspond to other doors such as a rear door, a back door, a luggage door (trunk lid), and a roof door (sliding roof panel).

(b) In the above-described embodiment mode, both the trim portion 5 and the seal portion 6 have been constructed of the material of EPDM, but may be alternatively manufactured by employing other materials. However, it is so assumed that the first and second elongated portions 31 and 32 are constructed of a solid material, whereas the expanded portion 33 is constructed of a sponge material.

(c) The weather strip 4 may be provided over the entire circumference portion of the door opening 3, or may be alternatively provided over a portion of the entire circumferential portion thereof. Also, the inventive idea of the present invention may be applied also to an extrusion molding portion of a weather strip which is constituted by being mold-connected. In addition, the inventive idea may also be applied to such a weather strip from which the insert 14 has been omitted.

(d) In the above-described embodiment mode, the lip portion 18 may be alternatively omitted, and also, the lip portion 18 may be alternatively provided in such a manner that this lip portion 18 is elongated from the coupling portion 13 to the vehicle inner side.

(e) In the above-described embodiment mode, all of the portion defined from the thicker-thickness portion 41 up to the tip portion (tip-sided communicated contact portion 34b) of the bridge 34, and the portion defined from the thicker-thickness portion 41 up to the tip portion of the first elongated portion 31. Alternatively, such a portion within the abutting portion 40 may be made thicker than the thinner-thickness portion 42, which is located in the vicinity of the tip-sided communicated contact portion 34b. Also, another portion of the abutting portion 40 may be made thicker than the thinner-thickness portion 42, which is located near the tip portion of the first elongated portion 31. Also, in the above-described embodiment mode, the portion within the expanded portion 33, which forms the second hollow portion 6b, has been made thicker than that of the thinner-thickness portion 42. Alternatively, such a portion within the expanded portion 33, which forms the second hollow portion 6b, may be made substantially equal to the thickness of the thinner-thickness portion 42. It should also be noted that it is preferable that the thickness of the thin-thickness portion 42 within the expanded portion 33 becomes the thinnest value.

Further, for example, the thickness of the abutting portion 40 may be alternatively made substantially uniform. Also, the thicknesses of the portions within the abutting portion 40, which are located in the vicinity of the tip-sided communicated contact portion 34b and also in the vicinity of the tip portion of the first extended portion 31, may be alternatively made thicker than a thickness of such a portion thereof which firstly abuts against of the circumferential portion of the door 2.

(f) Although no specific explanation has been made in the above-explained embodiment mode, the below-mentioned risk may occur. That is, in the case that a weather strip (extrusion-molded member) which is formed in a substantially linear shape by operating a predetermined extrusion molding machine is bent so as to be mounted with respect to a bent portion such as a corner portion of the door opening 3, there is such a risk that a seal portion having a hollow portion may be crushed to be deformed in such a manner that this seal portion is concaved to the inner side of the hollow portion at this bent portion. In this case, it is so observed that the seal portion elongated along the longitudinal direction of the weather strip is caved in at the bent portion. This cave-in shape may cause qualities of the outer appearance to be lowered. Although such a conventional technical idea capable of suppressing the above-explained crush deformation has been proposed by which the pad is inserted in the hollow portion, there is such a risk that a cumbersome work and a higher cost are necessarily required.

As previously described in the above embodiment mode, since the bridge 34 is provided, it is possible to suppress that the seal portion 6 is crushed to be deformed due to such a fact that the weather strip 4 is bent. However, with respect to such a portion within the expanded portion 33, which is located on the outer circumferential side of the door opening 2 rather than the communicated contact portion thereof (namely, tip-sided communicated contact portion 34b) with respect to the bridge 34, there is such a risk that this portion of the expanded portion 33 may be still crushed to be deformed in such a manner that this portion may be concaved to the inner side of the second hollow portion 6b.

Figure 5:
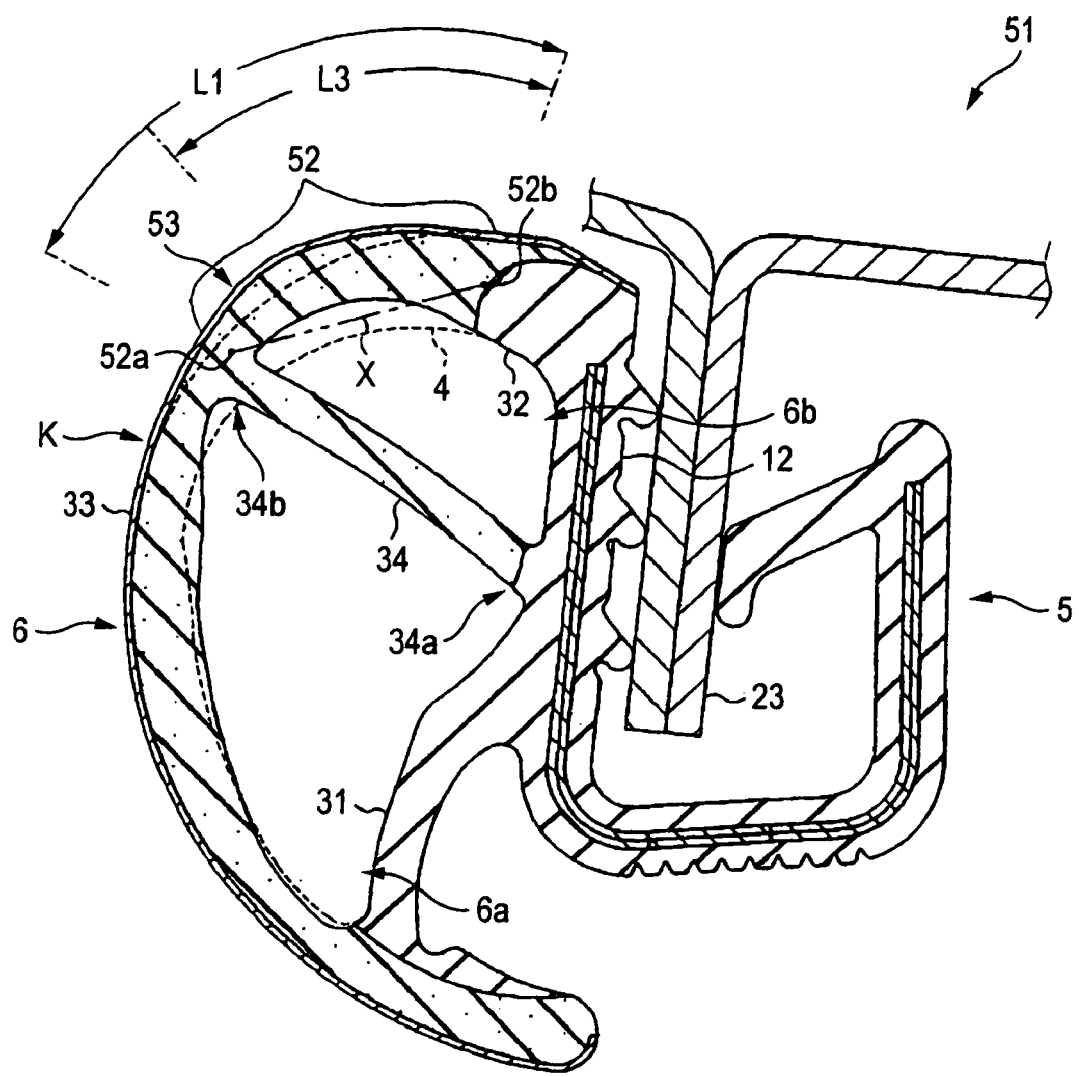
FIG. 5 is a sectional view for showing a weather strip according to another embodiment mode of the present invention.

In order to solve the above-described difficulty, such a weather strip 51 as shown by a solid line of FIG. 5 may be alternatively employed. Next, a detailed description will now be made of the weather strip 51 shown in FIG. 5 in comparison with the weather strip 4 of FIG. 2. It should also be noted that a dot line of FIG. 5 represents such a weather strip (weather strip 4) having a shape of a seal portion, which is the substantially same shape of the weather strip 4 shown in FIG. 2. Since the weather strip 51 is equipped with a basic structure which is similar to the basic structure of the weather strip 4 according to the above-described embodiment mode, for the sake of convenience, the weather strip 51 will be explained with employment of the same member names and the same member numbers.

As indicated by a solid line of FIG. 5, the weather strip 51 has been equipped with a bent portion 53 as a large curvature portion whose curvature is largely changed at the portion within the expanded portion 33, which is located on the outer circumference side of the door opening 3 rather than the tip-sided communicated portion 34b, namely such a portion (will be referred to as "outer circumference-sided forming portion 52" hereinafter) where the second hollow portion 6b is formed. In the weather strip 51, the outer circumferential-sided forming portion 52 has been expanded to the outer circumference side of the second hollow portion 6b, as compared with the weather strip 4 (refer to dot line of FIG. 5) of the above-explained embodiment mode. It should also be understood that a "curvature" described in this example basically implies a curvature of an outer circumferential plane of the expanded portion 33.

In other words, in the expanded portion 33 of the weather strip 4 indicated by a dot line (FIG. 2) of FIG. 5, a curvature of the portion on the outer circumferential side of the door opening 3 has been made slightly larger than a curvature of the portion on the inner circumferential side of the door opening 3, while such a portion (will be referred to as "inflection portion K" hereinafter) on the inner circumferential side of the door opening 3 slightly rather than the tip-sided communicated contact portion 34b is defined as a boundary. It should also be noted that curvatures as to any portions are substantially equal to each other within a section from the first elongated portion 31 up to the inflection portion K, and further, curvatures as to any portions are substantially equal to each other within a section up to the second elongated portion 32 from the inflection portion K. As a result, even when the entire portion of the expanded portion 33 is observed, such a bent portion where a curvature thereof is largely changed is not formed, but also, while the expanded portion 33 is smoothly curved, this expanded portion 33 has been coupled between a tip portion of the first elongated portion 31 and a tip portion of the second elongated portion 32.

To the contrary, in the expanded portion 33 of the weather strip 51 represented by a solid line of FIG. 5, a curvature of the portion on the outer circumferential side of the door opening 3 has been made slightly smaller than a curvature of the portion on the inner circumferential side of the door opening 3, while such a portion (will be referred to as "inflection portion K" hereinafter, since it is located at same position of inflection portion "K" indicated by dot line of FIG. 5) on the inner circumferential side of the door opening 3 slightly rather than the tip-sided communicated contact portion 34b is defined as a boundary. It should also be noted that although curvatures as to any portions are substantially equal to each other within a section from the first elongated portion 31 up to the inflection portion K, curvatures are changed within a section from the inflection portion K up to the second elongated portion 32.

More precisely speaking, in the weather strip 51 indicated by the solid line of FIG. 5, the curvatures are gradually increased from the inflection portion K toward the bent portion 53, and furthermore, the curvatures are gradually increased from the tip portion of the second elongated portion 32 toward the bent portion 53. In other words, at least in the vehicle outer-sided forming portion 52, the curvature at the bent portion 53 becomes the maximum curvature value. Also, the forming position of the bent portion 53 has been set within such a range that the below-mentioned value (L3/L1) becomes larger than, or equal to 0.60, and furthermore, becomes smaller than, or equal to 0.85. The above-described value is calculated by dividing a circumferential length "L3" of the expanded portion 33 defined from the second elongated portion 32 to the bent portion 53 by another circumferential length "L1" of the expanded portion 33 (namely, length of outer circumferential-sided forming portion 52) defined from the second elongated portion 32 to the tip-sided communicated contact portion 34b.

In addition, a portion of the inner side plane of the outer circumferential-sided forming portion 52 has been constructed as follows: That is, the above-described portion of the inner side plane is located on the outer circumferential side of the second hollow portion 6b rather than such a line segment "X", while this line segment "X" couples a center position 52a (along thickness direction) at a communicated contact portion between the bridge 34 and the outer circumferential-sided forming portion 52 with another center position 52b (along thickness direction) at a boundary portion between the second elongated portion 32 and the outer circumferential-sided forming portion 52. In other words, comparing with the weather strip 4 indicated by the dot line of FIG. 5, in the weather strip 51 indicated by the solid line of FIG. 5, although the outer circumferential-sided forming portion 52 has been expanded, the thickness of this outer circumferential-sided forming portion 52 is not made thick. As a result, it is possible to avoid the below-mentioned risk, namely, the function as the weather strip is deteriorated, due to such a fact that the thickness of the outer circumferential-sided forming portion 52 becomes excessively thick. As the function of the weather strip, this weather strip may seal the space between the door 2 and the body of the automobile.

It should also be understood that since the tip-sided communicated contact portion 34b is positioned on the outer circumferential side of the door opening 3 rather than the base-sided communicated contact portion 34a, when the seal portion 6 (namely, outer circumferential-sided forming portion 52) receives a stress directed to the inner circumferential side (namely, lower side as viewed in FIG. 5) of the door opening 3, the seal portion 6 can cause the bridge 34 to prop. As a result, it is possible to suppress such an event that the entire portion of the seal portion 6 is crushed to be deformed to the inner circumferential side of the door opening 2, as compared with such a case that the bridge 34 has been elongated parallel to the vehicle width direction.

Also, it is desirable that an angle of the bent portion 53 is an obtuse angle. Furthermore, it is desirable that the bent portion 53 is positioned on the inner circumferential side of the door opening 3 rather than the edge portion within the expanded portion 33, which is located at the outermost circumferential side of the door opening 3, and also, the bent portion 53 is positioned on the vehicle inner side rather than the edge portion within the expanded portion 33, which is located at the outermost vehicle side. Since these structures are conducted, it is possible to avoid the below-mentioned risk, namely, the function as the weather strip is deteriorated, due to such a fact that the outer circumferential-sided forming portion 52 is excessively expanded. As the function of the weather strip, this weather strip may seal the space between the door 2 and the body of the automobile.

As previously described, while the bent portion 53 has been provided with respect to the outer circumferential-sided forming portion 52, this outer circumferential-sided forming portion 52 has been expanded on the outer circumferential side of the second hollow portion 6b. There is such a risk that the above-described outer circumferential-sided forming portion 52 is crushed to be then deformed when the weather strip 51 is bent so as to be mounted with respect to the bent portion such as the corner of the door opening 2. As a result, when the outer circumferential-sided forming portion 52 receives the stress which is directed toward the inner circumferential side of the door opening 2, it is possible to suppress such an event that the outer circumferential-sided forming portion 52 is crushed to be then deformed in such a manner that this outer circumferential-sided forming portion 52 is concaved inside the second hollow portion 6b. As a consequence, it is also possible to suppress such a risk that a large difference is produced in these shapes (expanding degrees) between the outer circumferential-sided forming portion 52 which corresponds to the bent portion of the door opening 3, and the outer circumferential-sided forming portion 52 which corresponds to the linear portion of the door opening 3. Accordingly, it is possible to suppress that the quality of the outer appearance as to the weather strip 51 is deteriorated. Also, the workability can be improved and the cost can be suppressed, as compared with such a case that the pad, or the like is inserted in the hollow portion (second hollow portion 6b) in order to avoid that the hollow portion (second hollow portion 6b) is crushed to be deformed.

In addition, the forming position of the bent portion 53 has been set within such a range that the below-mentioned value (L3/L1) becomes larger than, or equal to 0.60, and further, becomes smaller than, or equal to 0.85. This value is calculated by dividing the circumferential length L3 of the expanded portion 33 defined from the second expanded portion 32 up to the bent portion 53 by the circumferential length L1 of the expanded portion 33 defined from the second expanded portion 32 up to the tip-sided communicated contact portion 34b. As previously described, the bent portion 53 is formed near the tip-sided communicated contact portion 34b at the outer circumferential-sided forming portion 52, so that an elongated angle of the outer circumferential-sided forming portion 52 which is elongated from the tip-sided communicated contact portion 34b toward the outer circumferential side of the door opening 3 can be approximated to the outer circumferential direction of the door opening 3 as being permitted as possible, which also corresponds such a direction along which the weather strip 51 is bent to be deformed. As a consequence, when the outer circumferential-sided forming portion 52 receives the stress directed to the inner circumferential side of the door opening 3, this outer circumferential-sided forming portion 52 (more specifically, portion on the side of tip-sided communicated contact portion 34b) can be more firmly propped, so that it is possible to more firmly suppress such an event that the outer circumferential-sided forming portion 52 is crushed to be deformed.

(g) Although the predetermined point has been pointed out as the bent portion 53 in FIG. 5, a certain range along the circumferential direction of the expanded portion 33 may be alternatively pointed out as the bent portion 53. Moreover, in the above-described item (f), such a structure has been explained that the curvature is gradually increased from both edge portions of the outer circumferential-sided forming portion 52 toward the bent portion 53. However, the present invention is not limited only to the above-described structure. Alternatively, such a structure may be constructed by that curvatures are divided into 3 different values in the outer circumferential-sided forming portion 52 at a bent portion having a certain length, a portion located on the side of the tip-sided communicated contact portion 34b rather than this bent portion, and another portion on the side of the tip portion of the second enlarged portion 32 rather than this bent portion along the circumferential direction of the expanded portion 33.

Also, although the curvature of the bent portion 53 is merely required to become larger than the curvatures as to both the adjoining portions of the expanded portion 33 along the circumferential direction, such a portion within the expanded portion 33, which has been bent at the largest bending angle, is not always the bent portion 53. In addition, although the curvature as to the expanded portion 33 of the weather strip 51 is changed while the inflection portion "K" is defined as the boundary, this curvature may not be changed.

In the case that a weather strip is constructed in such a way that the circumferential portion of the door 2 abuts also with respect to the outer circumferential-sided forming portion 52 when the door 2 is closed, the structure of the above-described item (f) is employed so as to suppress that the outer circumferential-sided forming portion 52 is crushed to be deformed. As a result, such an operation effect capable of avoiding a deterioration in the sealing characteristic may be achieved. Alternatively, the bent portion 53 may correspond to such a portion that an angle of the outer plane of the outer circumferential-sided forming portion 52 with respect to the vehicle width direction (otherwise, outer circumferential direction of the door opening 3), or may correspond to another portion containing the first-mentioned portion.

What is claimed is:

1. A weather strip, comprising:
   a trim portion that has a substantially U-shaped form of a sectional plane thereof, that is mounted on a flange portion provided along a door opening circumference portion of a vehicle, and that is equipped with a vehicle outer-sided side wall portion, a vehicle inner-sided side wall portion, and a coupling portion for coupling both the side wall portions to each other; and
   a seal portion comprising a hollow portion, in which the seal portion contacts a circumferential portion of a door of the vehicle under pressure when the door is closed,
   wherein the seal portion comprises:
      a first elongated portion which is elongated to a vehicle outer side from a portion located in a vicinity of a boundary portion between the seal portion and the coupling portion of the vehicle outer-sided side wall portion;
      a second elongated portion which is elongated to the vehicle outer side from a portion located in a vicinity of a tip portion of the vehicle outer-sided side wall portion; and
      an expanded portion having substantially an arc shape, which constitutes a convex shape on the vehicle outer side, the expanded portion coupling a tip portion of the first elongated portion to a tip portion of the second elongated portion,
   wherein the first and second elongated portions comprise a same material, and the expanded portion comprises a sponge material,
   wherein the weather strip further comprises:
      a bridge for coupling the expanded portion to a portion located in a vicinity of a boundary portion between the bridge and a first extended portion of the vehicle outer-sided side wall portion within the hollow portion, and for dividing the hollow portion into a first hollow portion on an inner circumferential side of the door opening, and a second hollow portion on an outer circumferential side of the door opening; and
      a portion within the expanded portion, which forms the first hollow portion, said portion within the expanded portion abuts against the circumferential portion of the door and is depressed to a vehicle inner side when the door is closed,
   wherein the expanded portion comprises:
      a thicker-thickness portion comprising a portion which abuts against the circumferential portion of the door when the door is closed, the thicker-thickness portion being located at the first hollow portion; and
      a thinner-thickness portion located between the thicker-thickness portion and a contact portion of the bridge, and between the thicker-thickness portion and a tip portion of the first elongated portion,
   wherein the bridge comprises the sponge material,
   wherein a lip portion is located between the expanded portion to and an inner circumferential side of a door opening, and
   wherein a thickness of an entirety of the portion of the thicker-thickness portion which abuts against the circumferential portion of the door is greater that a thickness of an entirety of a remaining portion of the first hollow portion other than the portion of the thicker-thickness portion which abuts against the circumferential portion of the door.

2. The weather strip according to claim 1, wherein a sponge layer elongated from the expanded portion is formed on a side of an outer surface of the second elongated portion.

3. The weather strip according to claim 1, wherein the bridge is elongated in a substantially linear form along a direction which is obliquely intersected with respect to a opening and closing direction of the door.

4. The weather strip as claimed in claim 1, wherein the thicker-thickness portion of the seal portion that is provided at a side of the first hollow portion contacts the door, and the thicker-thickness portion is formed so as to be between the thinner-thickness portion.

5. The weather strip as claimed in claim 1, wherein a position of the contact portion of the bridge with respect to the expanded portion is set within such a range that a value is larger than, or equal to 0.20, and is smaller than, or equal to 0.35, and the value is calculated by dividing a circumferential length of the expanded portion from a tip portion of the second elongated portion up to the contact portion of the bridge by another circumferential length of the expanded portion from a tip portion of the second elongated portion up to a tip portion of the first elongated portion.

6. The weather strip as claimed in claim 1, wherein a thickness of the thicker-thickness portion is in a range from 1.1 times to 1.4 times of a thickness of the thinner-thickness portion.

7. The weather strip as claimed in claim 1, wherein a position of the contact portion of the bridge with respect to the expanded portion is set within such a range that a value is larger than, or equal to 0.20, and is smaller than, or equal to 0.35, and the value is calculated by dividing a circumferential length of the expanded portion from a tip portion of the second elongated portion up to the contact portion of the bridge by another circumferential length of the expanded portion from the tip portion of the second elongated portion up to a tip portion of the first elongated portion, and
   wherein a thickness of the thicker-thickness portion is in a range from 1.1 times to 1.4 times of a thickness of the thinner-thickness portion.

8. The weather strip as claimed in claim 1, wherein another portion within the expanded portion, which forms the second hollow portion, does not abut against the door when the door is closed.

9. The weather strip as claimed in claim 1, wherein an entirety of the second hollow portion does not abut against the door when the door is closed.

10. The weather strip as claimed in claim 1, wherein another portion within the expanded portion, which forms the second hollow portion, is located away from an abutting area of the expanded portion against the door.

11. The weather strip as claimed in claim 1, wherein an entirety of another portion within the expanded portion, which forms the second hollow portion, is located away from an abutting area of the expanded portion against the door.

* * * * *